(12) United States Patent
McDavid

(10) Patent No.: US 11,519,322 B1
(45) Date of Patent: Dec. 6, 2022

(54) METHOD AND SYSTEM FOR FUEL COMBUSTION

(71) Applicant: Caterpillar Inc., Peoria, IL (US)

(72) Inventor: Robert M. McDavid, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/459,721

(22) Filed: Aug. 27, 2021

(51) Int. Cl.
*F02B 19/10* (2006.01)
*F02B 19/12* (2006.01)
*F02M 69/04* (2006.01)
*F02M 21/02* (2006.01)

(52) U.S. Cl.
CPC ........ *F02B 19/108* (2013.01); *F02B 19/1085* (2013.01); *F02B 19/12* (2013.01); *F02M 21/0254* (2013.01); *F02M 69/041* (2013.01)

(58) Field of Classification Search
None
See application file for complete search history.

(56) References Cited

U.S. PATENT DOCUMENTS

| | | | | |
|---|---|---|---|---|
| 3,983,847 A * | 10/1976 | Wyczalek | ........... | F02B 19/1085 123/270 |
| 4,041,922 A * | 8/1977 | Abe | ......... | F02B 51/04 123/169 MG |
| 4,140,090 A * | 2/1979 | Lindberg | ............. | F02B 19/108 123/3 |
| 4,344,403 A | 8/1982 | Child et al. | | |
| 4,986,248 A * | 1/1991 | Kobayashi | .......... | B05B 17/0623 123/472 |
| 5,725,151 A * | 3/1998 | Hetrick | ................. | F02M 27/04 239/3 |
| 6,450,154 B1 * | 9/2002 | Choi | ........................ | F02B 1/12 123/536 |
| 7,007,669 B1 * | 3/2006 | Willi | ................... | F02D 19/0692 123/430 |
| 7,424,883 B2 * | 9/2008 | McNichols | .......... | F02M 69/041 239/102.2 |
| 8,910,612 B2 | 12/2014 | Woo et al. | | |
| 9,145,826 B2 * | 9/2015 | Pendray | ................. | F02M 27/04 |
| 9,506,441 B2 | 11/2016 | Smither | | |
| 9,709,005 B2 * | 7/2017 | Pendray | ................. | F02M 69/08 |
| 9,771,919 B2 | 9/2017 | Kim et al. | | |
| 11,085,402 B1 * | 8/2021 | Vroman | ................. | F02M 23/04 |
| 2007/0170276 A1 * | 7/2007 | McNichols | .......... | F02M 47/027 239/533.2 |

(Continued)

FOREIGN PATENT DOCUMENTS

| CA | 1044973 A | * | 12/1978 | ............. | F02B 19/12 |
|---|---|---|---|---|---|
| CN | 204572180 U | * | 8/2015 | ............. | F02B 19/12 |

(Continued)

*Primary Examiner* — Kevin R Steckbauer
(74) *Attorney, Agent, or Firm* — Bookoff McAndrews, PLLC

(57) ABSTRACT

A fuel injector assembly for an internal combustion engine includes a proximal end portion, a distal end portion, and a fuel injector extending at least to the distal end portion, the fuel injector including a fuel opening. The fuel injector assembly also includes a chamber formed between the proximal and distal end portions, a flame passage extending from the chamber to the distal end portion, and an atomizer configured to provide atomization of liquid fuel injected into the chamber.

18 Claims, 2 Drawing Sheets

(56) References Cited

U.S. PATENT DOCUMENTS

| | | | | |
|---|---|---|---|---|
| 2008/0210773 | A1* | 9/2008 | Malek | F02M 69/041 |
| | | | | 239/585.5 |
| 2014/0069368 | A1* | 3/2014 | Pendray | F02M 25/0228 |
| | | | | 123/25 A |
| 2016/0053672 | A1* | 2/2016 | Loetz | F02B 19/108 |
| | | | | 123/275 |
| 2016/0160742 | A1 | 6/2016 | Willi et al. | |
| 2016/0363041 | A1* | 12/2016 | Moffat | F02F 1/24 |
| 2018/0135506 | A1* | 5/2018 | Grover, Jr. | H05H 1/2406 |
| 2021/0131337 | A1* | 5/2021 | Bromberg | H05H 1/2406 |

FOREIGN PATENT DOCUMENTS

| | | | | |
|---|---|---|---|---|
| CN | 107429602 A | * | 12/2017 | ............. F02B 19/10 |
| CN | 108730015 A | * | 11/2018 | ............. F02B 19/00 |
| CN | 108779701 A | * | 11/2018 | ............. F02B 19/08 |
| CN | 110206629 A | * | 9/2019 | ......... F02B 19/1023 |
| CN | 110206629 B | | 9/2019 | |
| CN | 110725765 A | * | 1/2020 | ............ F02B 19/108 |
| CN | 108730015 B | * | 3/2020 | ............. F02B 19/00 |
| CN | 110206629 B | * | 7/2020 | ......... F02B 19/1023 |
| CN | 112177764 A | * | 1/2021 | |
| CN | 112796870 A | * | 5/2021 | |
| CN | 113137321 A | * | 7/2021 | |
| CN | 113494349 A | * | 10/2021 | ............. F02B 19/02 |
| DE | 2530442 A | * | 1/1976 | ............. F02B 19/12 |
| DE | 102007003051 A1 | * | 7/2008 | ............. F02M 61/16 |
| DE | 102016110844 A1 | * | 12/2016 | ......... F02B 19/1004 |
| DE | 102015221076 A1 | * | 5/2017 | ......... F02B 19/1085 |
| DE | 102021108298 A1 | * | 10/2021 | ............. F02B 19/02 |
| EP | 390603 A | * | 10/1990 | ......... B05B 17/0623 |
| EP | 1910665 B1 | | 3/2009 | ............. F02M 45/10 |
| FR | 2888889 A1 | * | 1/2007 | ............. F02M 45/10 |
| FR | 2901575 A1 | * | 11/2007 | ......... F02D 41/2096 |
| FR | 2908834 A1 | * | 5/2008 | ......... F02M 51/0603 |
| GB | 1512053 A | * | 5/1978 | ............. F02B 19/12 |
| GB | 2077351 A | * | 12/1981 | ............. F02M 27/00 |
| GB | 2077351 B | | 12/1981 | |
| GB | 2077351 B | * | 6/1984 | ............. F02M 27/00 |
| IT | 1039642 B | * | 12/1979 | ............. F02B 19/12 |
| JP | 4942749 B2 | * | 5/2012 | ............. F02M 45/10 |
| RU | 2615880 C1 | * | 4/2017 | |
| WO | WO-9625592 A1 | * | 8/1996 | ......... F02B 19/1014 |
| WO | WO-2007010166 A2 | * | 1/2007 | ............. F02M 45/10 |
| WO | WO-2007135339 A1 | * | 11/2007 | ......... F02D 41/2096 |
| WO | 2010/101293 A1 | | 9/2010 | |
| WO | WO-2010101293 A1 | * | 9/2010 | ............. C10G 31/00 |
| WO | WO-2017093598 A1 | * | 6/2017 | |
| WO | WO-2019040432 A1 | * | 2/2019 | ............ F02B 19/108 |
| WO | 2020/255647 A1 | | 12/2020 | |
| WO | WO-2020255647 A1 | * | 12/2020 | ......... F02B 19/1085 |

* cited by examiner

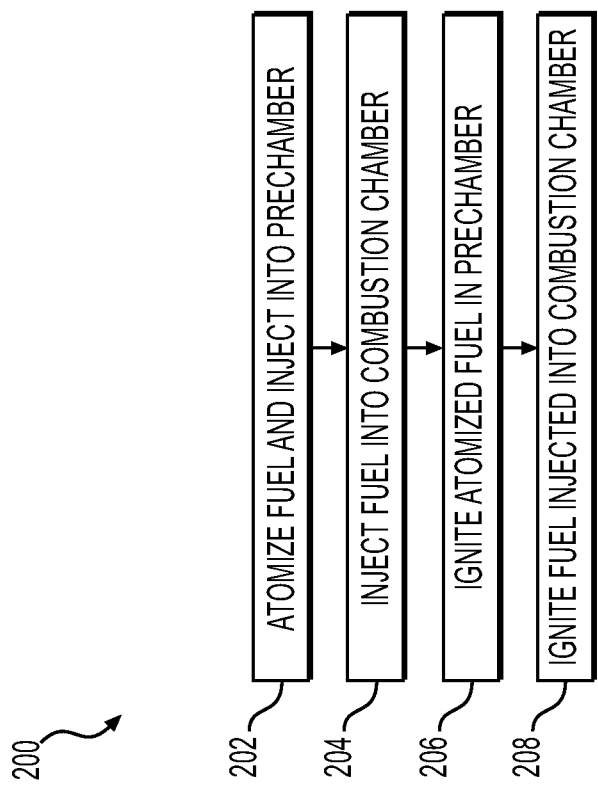

METHOD AND SYSTEM FOR FUEL COMBUSTION

TECHNICAL FIELD

The present disclosure relates generally to internal combustion engines, and more particularly, to methods and systems for precombustion chambers useful with internal combustion engines.

BACKGROUND

Internal combustion engines commonly combust liquid fuels, including diesel fuel or gasoline. In addition to these common fuel types, some internal combustion engines are configured for use with alternative fuels, the combustion of which produces a relatively low amount of greenhouse gases and/or soot. These alternative-fuel-compatible engines may be configured for combustion of fuel having a relatively high amount (e.g., 85% or more) of ethanol, for example. Alternative-fuel-compatible engines may also be configured for combustion of methanol. While alternative fuels provide advantages, the combustion of alternative fuels, including ethanol and/or methanol, also introduces challenges. For example, these fuels can be relatively slow to evaporate, making uniform ignition difficult. Additionally, these fuels can have a lower energy density as compared to diesel fuel, requiring the injection of a higher mass of fuel to generate a particular amount of power. The need to inject a larger amount of fuel can, for example, further impact the ability to produce uniform combustion by further slowing evaporation.

An exemplary diesel engine with a device for ultrasonic atomization of fuel is described in GB2077351 to Maynard et al. (the '351 patent). The device described in the '351 patent includes a precombustion portion with an ultrasonic injector. The ultrasonic injector is able to inject fuel into a spherical precombustion chamber through which fuel is ultimately supplied to an engine cylinder. While the precombustion chamber and ultrasonic device of the '351 patent may be useful for precombustion of diesel fuel, it may be unable to achieve the same results when combusting a low greenhouse gas fuel.

The disclosed methods and systems may solve one or more of the problems set forth above and/or other problems in the art. The scope of the current disclosure, however, is defined by the claims, and not by the ability to solve any specific problem.

SUMMARY

In one aspect, a fuel injector assembly for an internal combustion engine may include a proximal end portion, a distal end portion, and a fuel injector extending at least to the distal end portion, the fuel injector including a fuel opening. The fuel injector assembly may also include a chamber formed between the proximal and distal end portions, a flame passage extending from the chamber to the distal end portion, and an atomizer configured to provide atomization of liquid fuel injected into the chamber.

In another aspect, a combustion system may include a fuel storage device for storing a liquid fuel, an internal combustion engine including a combustion chamber, and a fuel injector configured to directly inject a first portion of the fuel into the combustion chamber. The combustion system may also include an atomizer configured to receive a second portion of the fuel and inject the second portion of the fuel into a precombustion chamber upstream of the combustion chamber.

In yet another aspect, a method of combusting fuel may include supplying fuel, in liquid form, to an atomizer, injecting the fuel supplied to the atomizer into a precombustion chamber and atomizing the fuel supplied to the atomizer. The method of combusting fuel may also include injecting fuel into a combustion chamber, igniting the atomized fuel in the precombustion chamber, and igniting the fuel injected into the combustion chamber with the ignited atomized fuel.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 is a flowchart showing an exemplary method for combusting fuel, according to aspects of the disclosure.

DETAILED DESCRIPTION

Figure 1:
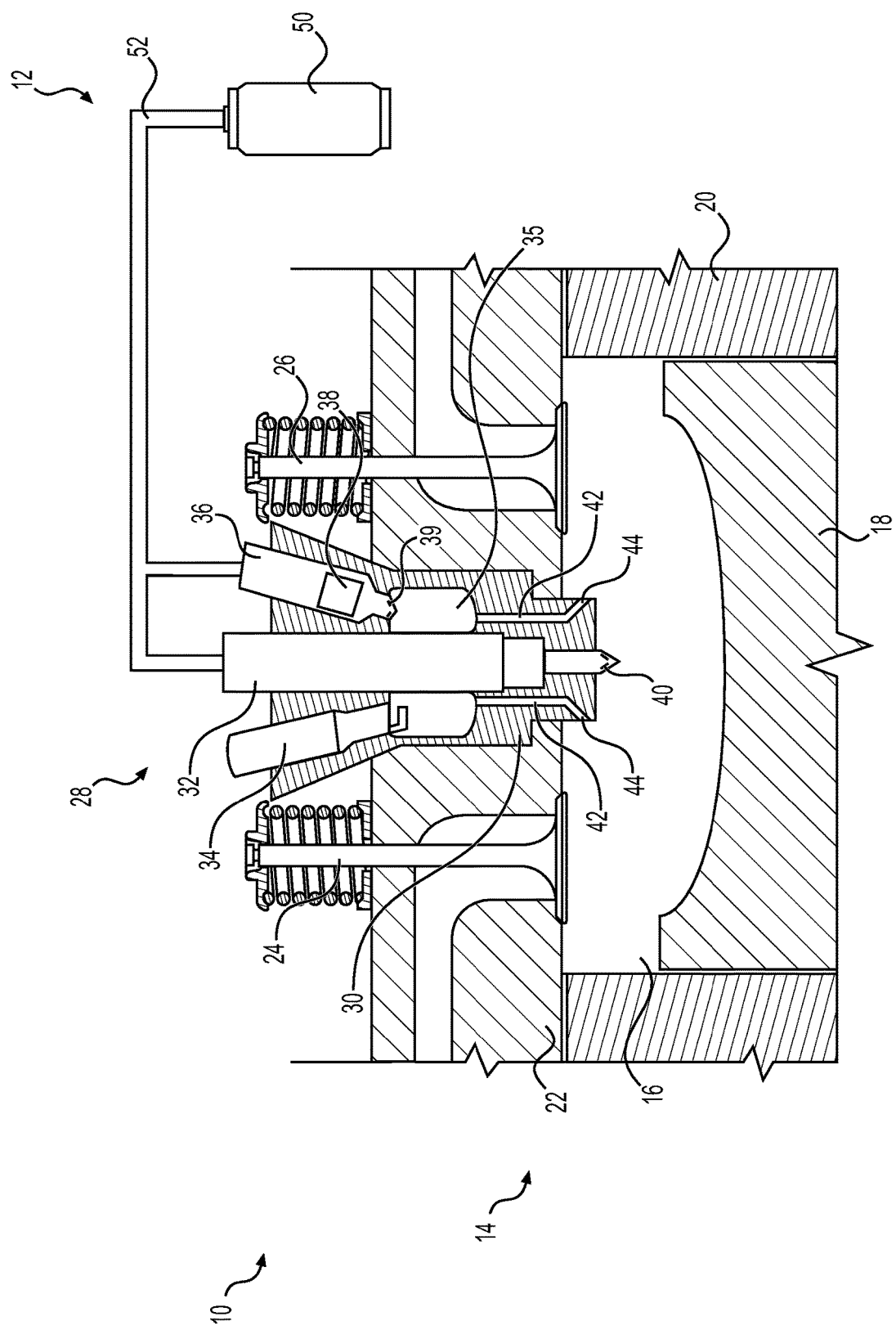
FIG. 1 is a partially schematic cross-sectional view of a fuel combustion system, according to aspects of the disclosure.

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

FIG. 1 illustrates an exemplary fuel combustion system 10 according to an aspect of the disclosure. Fuel combustion system 10 may include a fuel supply system 12 and an internal combustion engine 14. Fuel supply system 12 may include one or more devices for storing and supplying a low greenhouse gas fuel (also referred to herein as a low GHG fuel), and a fuel injector assembly 28 for providing this fuel to internal combustion engine 14. As used herein, a "low greenhouse gas fuel" includes a fuel, other than gasoline or diesel fuel, that is able to be supplied in liquid form to a fuel injector. In particular, a low greenhouse gas fuel may include an alcohol (e.g., methanol, ethanol, butanol, propanol, and/or other alcohols, including blends that include at least 80% alcohol, such as fuel containing about 85% methanol or about 85% ethanol), a vegetable oil fuel, biodiesel, dimethyl ether, oxymethylene dimethyl ether, ammonia, or a combination thereof.

Internal combustion engine 14 may include an engine block 20 and cylinder head 22. Engine block 20 may define a plurality of cylinders in which pistons 18 are disposed. These cylinders may each form a respective combustion chamber 16 with head 22 to combust fuel injected with a direct injector 32 of fuel supply system 12, as described below. While one cylinder and combustion chamber 16 is shown in FIG. 1, internal combustion engine 14 may include a plurality of cylinders formed in one or more rows (e.g., 4, 6, 8, 10, or 12 cylinders). Each cylinder of internal combustion engine 14 may be in fluid communication with one or more intake valves 24 configured to provide a supply of clean intake air, such as air free of fuel, to respective combustion chambers 16. The cylinders of engine 14 may also be in fluid communication with one or more exhaust valves 26 operable to allow combustion products to exit respective combustion chamber 16.

In the exemplary configuration illustrated in FIG. 1, fuel supply system 12 includes a fuel storage device 50, a fuel supply line 52, and fuel injector assembly 28 that includes direct fuel injector 32, which may be an electronically-controlled injector or a mechanically-actuated, electronically-controlled unit injector, an igniter 34 such as a spark plug configured to generate a spark for igniting fuel, a glow plug, or a plasma ignition system, and an atomizer 36. Fuel storage device 50 may include one or more fuel storage tanks (e.g., tanks of a power generation system, machine, vehicle, etc.) configured to store a low GHG fuel. Fuel supply line 52 may include one or more fuel passages, valves, pumps, pressure regulators, etc., to controllably provide liquid fuel at a suitable pressure to components of fuel injector assembly 28. For example, fuel supply line 52 may be configured to supply high pressure liquid fuel to a direct fuel injector 32 of fuel injector assembly 28, and to an atomizer 36 of fuel injector assembly 28, via a common rail and a high pressure pump. In configurations where direct injector 32 is mechanically-actuated (e.g., a mechanically-actuated electronically-controlled unit injector), fuel may be delivered at a relatively low pressure to injector 32.

Fuel injector assembly 28 may facilitate combustion of fuel outside of combustion chamber 16, such as within a precombustion chamber (also referred to herein as a chamber). In particular, fuel injector assembly 28 may include a precombustion chamber 35 adjacent to and in fluid communication with igniter 34 and atomizer 36. Fuel injector assembly 28 may be formed with a housing 30 that secures direct injector 32, igniter 34, and atomizer 36 together as a single integral structure. For example, direct injector 32, igniter 34, and atomizer 36 may be installed and/or removed from head 22 together as a unit with housing 30. Fuel injector assembly 28 may be installed within head 22 in any desirable manner, such as via a press fit, threading, etc. As shown in FIG. 1, fuel injector assembly 28 may be secured within head 22 such that assembly 28 extends through a single bore formed within head 22. As fuel injector assembly 28 is installed directly to head 22, fuel injector assembly 28 may be configured to inject fuel directly into respective combustion chamber 16 without supplying fuel to an intake passage upstream of intake valve 24. Thus, system 12 may be free of a port fuel injector.

Direct injector 32 may be an electronically-controlled fuel injector that includes a proximal end and a distal end having one or more direct injector fuel openings 40. In the exemplary configuration shown in FIG. 1, direct injector openings 40 may be positioned distally of engine head 22 so as to supply highly-pressurized fuel within combustion chambers 16. Direct injector fuel openings 40 may be directed to supply jets of low GHG fuel toward a top surface of piston 18 at a desired timing. Direct injector 32 may be secured within a central longitudinal bore extending from a proximal end of fuel injector assembly 28 to a distal end of injector assembly 28. While FIG. 1 shows direct injector 32 mounted directly within housing 30, direct injector 32 and/or housing 30 may include a liner, insert, coating, or other structure configured to protect injector 32 from heat, especially in the region of injector 32 that is surrounded by chamber 35.

Direct injector 32 may include an actuator that is movable in response to a command issued by an electronic control unit (not shown). This electronic control unit, or a separate electronic control unit, may also be configured to control actuation, for example, of atomizer 36, as described below. This electronic control unit may further be configured to control the supply of low GHG fuel via fuel supply line 52.

Fuel injector assembly 28 may further include a bore that extends through the proximal end of housing 30 to secure atomizer 36 adjacent to injector 32. Atomizer 36 may be configured to inject fuel to an interior of housing 30, such as chamber 35. In at least one aspect, atomizer 36 may be an atomizing fuel injector that includes one or more atomizer orifices or openings 39 at a distal end thereof, and an atomizing element 38. Atomizer 36 may be, for example, an ultrasonic atomizer, an electrostatic atomizer, or a supersonic atomizer.

In a first exemplary configuration, atomizer 36 may be an ultrasonic device in which atomizing element 38 is an ultrasonic transducer, such as a piezoelectric transducer or a magnetostrictive transducer. Atomizing element 38 may be connected to an energy source, such as an AC energy source that supplies electrical energy to cause atomizing element 38 to vibrate at high frequency. In an alternate configuration, atomizer 36 may be an electrostatic device. When atomizer 36 is formed as an electrostatic device, atomizing element 38 may include a high voltage electrode or lead within atomizer 36 that is connected to an electrical energy source. This high voltage lead may enable the application of an electrical field to facilitate breakup of fuel injected with atomizer 36 into chamber 35. In another exemplary configuration, atomizer 36 may be a supersonic device. When configured for supersonic injection of fuel, atomizer opening 39 may inject fuel at a speed greater than the speed of sound. For example, fuel injected with atomizer openings 39 of atomizer 36 may be supplied to these openings 39 at a sufficient pressure such that fuel exits atomizer opening 39 at a speed higher than the speed of sound.

Precombustion chamber 35 may have a suitable shape for receiving fuel from atomizer 36 and for facilitating the combustion of this fuel at a location upstream of combustion chamber 16. For example, chamber 35 may have an approximately annular or toroidal shape that surrounds a longitudinal axis of fuel injector assembly 28. As shown in FIG. 1, housing 30 of fuel injector assembly 28 may itself define precombustion chamber 35 between the proximal and distal ends of fuel injector assembly 28. Alternatively, chamber 35 may be formed by an insert secured within housing 30.

A proximal end of precombustion chamber 35 may include an opening through which a distal end of igniter 34 extends. This distal end may include electrodes configured to generate a spark. The proximal end of chamber 35 may further include an opening through which a distal end of atomizer 36 extends allowing atomizer openings 39 to inject fuel within chamber 35. A distal end of chamber 35 may be connected to one or more flame paths or passages 42. Flame passages 42 may be formed within housing 30 so as to extend from the distal end or floor of chamber 35 to a distal end of fuel injector assembly 28. As shown in FIG. 1, flame passages 42 may be formed within housing 30 so as to terminate in obliquely-angled flame openings 44 that face combustion chamber 16. While two flame passages 42 and two flame openings 44 are shown in FIG. 1, as understood, fuel injector assembly 28 may include one, three, four, six, eight, or more one or more flame passages 42 and flame openings 44 spaced apart along a circumference of the distal end of fuel injector assembly 28.

INDUSTRIAL APPLICABILITY

The disclosed aspects of fuel combustion system 10 may be employed in a variety of internal combustion engines that are configured to combust fuels, including internal combustion engines for combusting fuel other than gasoline and diesel fuel. For example, fuel combustion system 10 may be useful for combusting a low GHG fuel, such as methanol. System 10 may be included in a power generation system, machine (e.g., dozer, excavator, loader, pipelaying machine, grading machine, etc.), vehicle, or other device that employs an internal combustion engine. System 10 may include a plurality of cylinders that form a plurality of combustion chambers 16. Each of these cylinders may include a respective fuel injector assembly 28, the plurality of fuel injector assemblies 28 being configured to receive fuel from a single fuel storage device 50 or a plurality of fuel storage devices 50.

During the operation of system 10, fuel stored in one or more fuel storage devices 50 may be pumped, at high pressure, to a plurality of fuel injector assemblies 28 positioned within engine head 22. A first portion of the fuel supplied to a particular assembly 28 may be supplied to injector 32 for injection directly into combustion chamber 16, while a second portion of fuel for the same assembly 28 may be supplied to atomizer 36 for atomization and injection into the interior of fuel injector assembly 28, and in particular, injection into the interior of combustion precombustion chamber 35. Atomizer 36 may be electronically-controlled such that atomizer 36 is configured to inject fuel independently of direct injector 32. Igniter 34 may also be electronically-controlled to ignite fuel within chamber 35 in a controlled manner. To facilitate the combustion of fuel within combustion chambers 16, one or more intake valves 24 and one or more exhaust valves 26 may open and close so as to respectively provide fresh intake air (e.g., air substantially free of fuel) to combustion chambers 16, and to allow combustion products to exit combustion chambers 16.

FIG. 2 is a flowchart illustrating an exemplary method 200 of combusting fuel. In particular, method 200 may be useful for the combustion of a low GHG fuel supplied in liquid form to one or more fuel injector assemblies 28. Method 200 may be performed when engine 14 is running so as to generate electricity (via driving a generator), to generate power for operating a machine, to provide energy for locomotion of a vehicle, etc.

A first step 202 of method 200 may include injecting fuel into a chamber formed within fuel injector assembly 28, such as precombustion chamber 35. Fuel, such as low GHG fuel, may be supplied as a high-pressure flow to an inlet of atomizer 36. The fuel received by atomizer 36 may traverse one or more internal passages of atomizer 36 to atomizer opening(s) 39 through which fuel is injected while being ultrasonically atomized, electrostatically atomized, or supersonically atomized to produce a plurality of fine droplets that readily evaporate within chamber 35. In the example of ultrasonic atomization, an ultrasonic transducer (e.g., atomizing element 38), may be activated with an AC current applied in response to commands from an electronic control unit. This AC current may be supplied to a piezoelectric transducer or a magnetostrictive transducer so as to cause the transducer to vibrate at a high frequency and thereby generate a mechanical force to facilitate atomization of fuel injected via atomizer opening 39. In configurations where atomizer 36 electrostatically atomizes fuel injected via atomizer opening 39, an electric field may be generated with atomizing element 38 (e.g., a high-voltage lead secured within fuel injector assembly 28). This electric field may, for example, increase breakup of particles of fuel injected via atomizer opening 39 by reducing surface tension and by applying electrostatic force in addition to the aerodynamic shear encountered by the fuel that exits atomizer opening 39. In configurations where atomizer 36 is configured for supersonic injection of fuel, atomizer opening 39 may be sized to cause fuel to exit at supersonic speeds when highly-pressurized fuel is supplied to atomizer 36. A supersonically-configured atomizer 36 may omit a separate atomizing element 38 and may cause fuel to exit atomizer opening 39 at a speed greater than the speed of sound, facilitating atomization of fuel injected into chamber 35.

A step 204 may include injecting fuel into a combustion chamber 16 of internal combustion engine 14. In particular, step 204 may include storing low GHG in fuel storage device 50 and supplying this fuel from fuel storage device 50 to fuel injector assembly 28. The fuel may be pumped at high pressure to an electronically-controlled direct fuel injector 32. However, in at least some configurations, fuel may be pumped at a relatively low pressure to a mechanically-actuated (e.g., cam-actuated) electronically-controlled unit injector 32. In response to a command signal generated with an electronic control unit, direct injector 32 may inject fuel, via one or more injector openings 40, to a combustion chamber 16 formed within the interior of engine block 20 (e.g., towards a top surface of piston 18). Fuel injected with direct injector 32 via openings 40 may bypass chamber 35, and may also bypass the air intake section of engine 14. Thus, fuel injected via direct injector 32 may be supplied to engine 14 separately from intake air that enters respective combustion chambers 16 via one or more intake valves 24.

A step 206 may include igniting the fuel that was injected into precombustion chamber 35 during step 202. Atomized fuel within chamber 35 may be ignited by igniter 34, in response to a command from an electronic control unit. Igniter 34, which may include a spark plug, glow plug, or plasma ignition device, may generate a spark or otherwise discharge energy to ignite atomized fuel within chamber 35. To facilitate this ignition of atomized fuel within chamber 35, igniter 34 may include a distal end that extends within chamber 35, as shown in FIG. 1. Additionally, the activation of igniter 34 may be controlled based on an amount of time necessary for fuel to sufficiently atomize within chamber 35 after exiting atomizer opening 39.

A step 208 may include igniting the fuel injected via direct injector 32 into combustion chamber 16. The ignition of fuel within combustion chamber 16 may be initiated with flames generated by the ignition of atomized fuel in step 206. When atomized fuel within chamber 35 is ignited as described with respect to step 206, the resulting flames may enter and pass through one or more flame passages 42 to respective flame openings 44 formed at distal ends of fuel injector assembly 28. These flame openings 44 may be oriented toward the interior of respective combustion chambers 16. Thus, combustion of fuel injected with one or more direct injector fuel openings 40 may be initiated by flames that propagate after exiting from flame openings 44 of fuel injector assembly 28. Flame openings 44 may be positioned so as to initiate combustion in a suitably uniform manner, such that flames prorogate within combustion chamber 16 to facilitate complete combustion of fuel injected with one or more direct injector fuel openings 40.

While steps 202, 204, 206, and 208 have been described with an exemplary order, as understood, one or more of these steps may be performed in a different order. Moreover, one or of these steps may be performed simultaneously and/or at overlapping periods of time.

The disclosed fuel combustion system and method may allow for controlled combustion of fuel within a precombustion chamber 35, enabling the creation of hot flame jets that readily ignite the majority of the fuel injected to the interior of an engine cylinder. The use of an atomization device may also facilitate the injection of a larger quantity of fuel, improving power output and facilitating direct injection of a low GHG fuel. For example, it may be possible to employ a fuel injector having larger injector orifices, as compared to a diesel fuel injector for an engine having the same displacement, while avoiding problems associated with incomplete fuel combustion. Increased atomization of injected low GHG fuel, such as liquid methanol, can also prevent delayed and/or aggressive combustion and pool fires. Additionally, the disclosed system and method may enable combustion of a low GHG fuel, such as methanol, without the need to supply a second type of fuel. In particular, fuel combustion system 10 may be configured to combust fuel without the need to generate a pilot flame with diesel fuel. Fuel combustion system 10 may also enable the omission of a spark plug that extends to a combustion chamber of the engine.

It will be apparent to those skilled in the art that various modifications and variations can be made to the disclosed method and system without departing from the scope of the disclosure. Other embodiments of the method and system will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. A fuel injector assembly for an internal combustion engine, the fuel injector assembly comprising:
    a proximal end portion;
    a distal end portion;
    a fuel injector secured within a housing of the fuel injector assembly and extending at least to the distal end portion, the fuel injector including a fuel opening;
    a chamber formed between the proximal and distal end portions and surrounding the fuel injector;
    a flame passage extending from the chamber to the distal end portion; and
    an atomizer configured to provide atomization of liquid fuel injected into the chamber.

2. The fuel injector assembly of claim 1, wherein the atomizer is an electrostatic device, a supersonic device, or an ultrasonic device.

3. The fuel injector assembly of claim 2, wherein the atomizer is an ultrasonic device that includes a magnetostrictive element or a piezoelectric element.

4. The fuel injector assembly of claim 1, wherein the atomizer is included in an atomizing fuel injector that has a fuel orifice that faces an interior of the chamber.

5. The fuel injector assembly of claim 4, further comprising a fuel ignition device configured to ignite fuel within the chamber after the fuel is injected with the fuel orifice of the atomizing fuel injector.

6. The fuel injector assembly of claim 1, wherein the fuel injector is secured within a housing of the fuel injector assembly.

7. A combustion system, comprising:
    a fuel storage device for storing a liquid fuel;
    an internal combustion engine including a combustion chamber;
    a fuel injector configured to directly inject a first portion of the fuel into the combustion chamber;
    a fuel injector assembly housing removably installed in a cylinder head of the internal combustion engine; and
    an atomizing fuel injector extending within the fuel injector assembly housing, the atomizing fuel injector being configured to receive a second portion of the fuel and inject the second portion of the fuel into a precombustion chamber upstream of the combustion chamber wherein the fuel injector extends within the fuel injector assembly housing.

8. The combustion system of claim 7, wherein the fuel storage device stores methanol, ethanol, butanol, propanol, vegetable oil fuel, biodiesel, or a combination thereof, as the liquid fuel.

9. The combustion system of claim 7, wherein the precombustion chamber and an atomizer of the atomizing fuel injector are both positioned within the housing of the fuel injector assembly.

10. The combustion system of claim 9, wherein the fuel injector assembly includes a flame path extending from the precombustion chamber to the combustion chamber.

11. The combustion system of claim 9, further including an ignition device extending within the housing and configured to ignite atomized fuel injected into the precombustion chamber.

12. The combustion system of claim 7, wherein the atomizing fuel injector includes an electrostatic device, a supersonic device, or an ultrasonic device.

13. The combustion system of claim 7, wherein the atomizing fuel injector and an igniter are inserted through an end of the fuel injector assembly housing.

14. A method of combusting fuel, comprising:
    supplying fuel, in liquid form, to an atomizing fuel injector, including an atomizing element, secured in a housing of a fuel injector assembly;
    injecting the fuel supplied to the atomizing fuel injector into a precombustion chamber and atomizing the fuel with the atomizing element, the precombustion chamber and the atomizing fuel injector being removable from a cylinder head together with the housing of the fuel injector assembly;
    injecting fuel into a combustion chamber via a fuel injector secured in the housing of the fuel injector assembly;
    igniting the atomized fuel in the precombustion chamber; and
    igniting the fuel injected into the combustion chamber with the ignited atomized fuel.

15. The method of claim 14, wherein atomizing the fuel includes distributing the fuel as a plurality of droplets with an electrostatic device, a supersonic device, or an ultrasonic device that includes the atomizing element.

16. The method of claim 14, wherein atomizing the fuel includes supplying electrical energy to the atomizing element to generate an electric field or to generate high-frequency vibrations.

17. The method of claim 14, wherein the atomizing fuel injector is secured to the fuel injector assembly to inject fuel into the precombustion chamber.

18. The method of claim 17, wherein the precombustion chamber is formed within the fuel injector assembly so as to surround the fuel injector.

* * * * *